3,726,831
PROCESS FOR PREPARING POLYIMIDES FROM AMINO AROMATIC DICARBOXYLIC ACIDS AND ESTER DERIVATIVES OF SAID ACIDS
Luis Acle, Jr., William R. Boram, and John V. Long, San Diego, Calif., assignors to International Harvester Company, San Diego, Calif.
No Drawing. Continuation of abandoned application Ser. No. 692,279, Dec. 21, 1967. This application Nov. 10, 1970, Ser. No. 88,511
Int. Cl. C08g 20/32
U.S. Cl. 260—47 CP                5 Claims

ABSTRACT OF THE DISCLOSURE

Monomeric aromatic compounds having two carboxylic groups and an amino group so situated as to allow the monomer to be condensed to a polyamic acid or a derivative thereof with subsequent cyclization to a polyimide, together with the intermediate and end products. The preparation of the monomers and processes of preparing polyamic acids and polyimides therefrom.

---

This application is a continuation of application No. 692,279 filed Dec. 21, 1967, for "Products and Processes" which has been abandoned.

This invention relates to novel monomers and polymers and to processes for their preparation. More specifically, the present invention relates to novel monomeric materials that will condense to form polyimides of unique molecular structure.

The monomers of the present invention are bifunctional aromatic compounds with two carboxylic acid or carboxylic acid derivative groups and an amino group so positioned as to allow condensation to take place with the formation of a polyamic acid intermediate or its derivative followed by cyclization to form a polyimide. They have the general structural formula

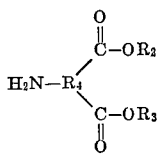

where $R_4$ is (1) a trivalent radical characterized by some degree of aromatic unsaturation and the carbonyl groups are attached to adjacent carbon atoms of a ring of aromatic character in the radical with the amino group being situated on a portion of the radical other than said ring or (2) a radical of the formula $$-Ar_1-Ar_2- \text{ or } -Ar_1-R_1-Ar_2<$$

where $Ar_1$ is a divalent homocyclic or heterocyclic radical characterized by aromatic unsaturation; $Ar_2$ is a tri-substituted benzene; $R_1$ is a divalent radical capable of simplifying the synthesis of the compound and/or of producing other desirable results such as increasing the shelf life of the compound and/or the temperature resistance of the polyimide into which the monomer is ultimately transformed; and $R_2$ and $R_3$ are —H or alkyl.

Substantially the only additional limitations on the radicals $Ar_1$ and $Ar_2$ are synthesis considerations and a requirement that the substituents be so positioned as to allow formation of the imide ring when the monomer is polymerized. This makes impractical and may even completely rule out the use of radicals of more than a given size or combinations of radicals in which the substituents of the two radicals are in close proximity. In both of these cases, undue stress may be placed on a chemical bond, causing a loss of stability and making ring formation impossible.

Typical—but by no means the only—radicals capable of forming monomers in accord with the present invention are substituted benzenes ($Ar_1$ and $Ar_2$) and pyridines ($Ar_1$) with radicals having the following formulae being preferred.

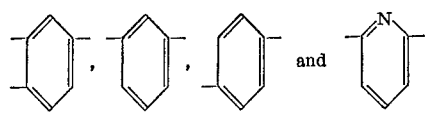

Other radicals may be employed as long as they meet the requirements outlined above.

The flexibility in the choice of aromatic radicals which can be employed is a desirable and important feature of the present invention. Specifically, the nature of radical $Ar_1$ may influence the solubility of the monomer and intermediate, depending upon whether it is meta- or para-substituted. Also compounds containing radicals such as pyridines are more soluble in water than those containing benzene radicals due to the possible formation of the water soluble pyridium ion in the former. The nature of this aromatic radical also affects the amorphousness and resinousness of the monomer and intermediate, depending upon its influence on the degree of biaxial symmetry of the monomer. Accordingly, by changing the nature of this radical, the solubility, ease or processing, glass transition temperature, and other characteristics of the monomer and therefore the resulting polymer can be varied, permitting both the monomer and polymer to be tailored for specific uses.

As far as $R_1$ is concerned, it can be eliminated so that there may be simply a carbon-carbon bond between the two aromatic radicals $Ar_1$ and $Ar_2$ as suggested above. Compounds of this type, however, tend to be relatively difficult to synthesize and yields may be low, making them relatively expensive to produce and therefore of interest primarily where properties attributable to the absence of a bridging radical outweight cost considerations. On the other hand, where such attributes are not required, the syntheses of the compounds contemplated by the invention can in general be simplified and made more economical by utilizing an appropriate radical between the aromatic groups. We accordingly prefer in most cases that such a radical be employed, especially where the physical characteristics of competing systems with and without the bridging radical are comparable.

In addition to simplifying the synthesis of the monomer the bridging radical can be advantageously employed in many cases to increase the shelf life of the compound and/or improve its properties at high temperatures as mentioned above. For these additional reasons inclusion of a bridging radical in the monomer is normally preferred.

The essential characteristics of the bridging radical $R_1$ are that is be divalent and that it not preclude formation of the imide when polymerization occurs. Also, it is preferred that the radical be electron withdrawing in nature, for such radicals tend to stabilize the electron-rich portions of the molecule. This tends to make the amine function of the monomer less susceptible to oxidation, which in turn improves the shelf life of the material. Electron donating radicals can of course be employed where other attributes appurtenant to their use outweigh the advantages obtained by the use of electron withdrawing radicals.

Among the bridging groups or radicals found to give the best results are —SO$_2$— and —CO—. Many other radicals may also be utilized including, without limitation, the following:

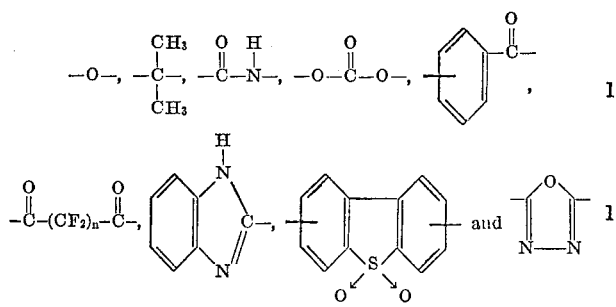

As in the case of the aromatic radicals Ar$_1$ and Ar$_2$, variation in the bridging groups which can be employed is an important feature of the present invention. This feature further increases the opportunities for tailoring the compounds of the present invention so that they will the optimum properties for specific applications.

Specifically, the degree of rotational freedom about the bridge axis affects the mechanical flexibility of the polymer as well as it glass transistion temperature and, accordingly, its high temperature properties. Since the degree of rotational freedom is dependent upon the particular radical employed, the latitude of choice permitted for the bridge radical allows these characteristics of the polymer to be varied for specific applications of the invention.

As far as the monomer is concerned, changes in the bridge group affect the solubility of the monomer the most. Also, the nature of the bridging group, like that of radicals Ar$_1$ and Ar$_2$, affects its crystalline character or amorphousness. These characteristics of the monomer can of course be varied by selecting the bridging group accordingly.

When an alkyl group is used in the —OR$_2$ and —OR$_3$ radicals it will typically be methyl, ethyl, propyl, isopropyl, or benzyl. Other alkyl radicals may, however, be employed to vary the characteristics of the monomer as such as well as the condensation of the monomer to a polyimide, again affording an opportunity for tailoring the system to meet the needs of particular applications.

Specifically, as the size of the alkyl group is increased, the volatility of the corresponding alcohol from which the group is added to the monomer decreases, and a higher temperature is required to eliminate the solvent as well as the condensation products. The rate of cure is also affected with the higher homologs requiring higher cure temperatures and/or longer cure cycles than hydrogen or the lower alkyls. The size of the alkyl group also affects properties associated with the resinous nature of the precursor such as tackiness rate of solvent evaporation, etc.

Synthesis considerations may impose one limitation on the alkyl group which can be employed. Substantially the only other limitation is that the radicals R$_2$ and R$_3$ must be such that they will allow elimination of the condensation product during the curing cycle inasmuch as they are eliminated in the condensation of the monomer.

As will be apparent from the structural formula set forth above and the examples which follow, the novel monomers disclosed herein may be diacids or mono- or di-derivatives thereof. That the monomers can take these several forms is another important feature of the present invention since this provides additional opportunities for tailoring the monomers or precursors to meet the requirements of particular applications of the invention. For example, the mono- and di-ester precursors of the invention are usually more amorphous and have lower melting points than the acids. Accordingly, when amorphousness and/or a low melting point are desired, a monoester or a diester monomer can be utilized. On the other hand, where exaggeration of these characteristics is not required, worthwhile economies may be obtainable by utilizing a monoester or acid monomer since these (particularly the acid monomers) are typically less expensive to synthesize than the diesters.

In addition to the foregoing it will be apparent that the radical R$_4$ in the formula set forth above may take many other forms. Typical, but by no means the only radicals which may be utilized, are:

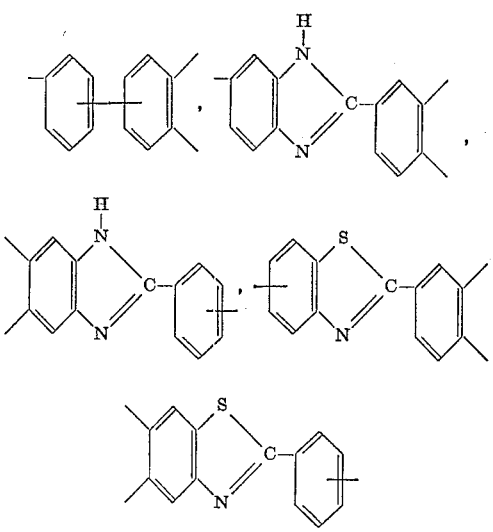

and

In short, the essential characteristic of the monomers of the present invention is the position of the functional groups and the reactions that they undergo independently of the radical to which they are attached.

The novel monomers described above are prepared by building a molecule with imide forming functionalities from appropriate starting compounds. The order in which these functionalities are added to the molecule is unrestricted, and any desired methods may be employed to add them. One synthesis which may be used produces an intermediate compound which is an orthodimethylaryl-nitroaryl compound in which the two aryl groups are joined by a divalent bridging group R$_1$ or by a carbon-carbon bond and which has the formula O$_2$N—R$_4$—(CH$_3$)$_2$. Typical of these intermediates, which may accordingly be considered as starting compounds for the novel monomers disclosed herein, are 3,4-dimethyl-4'-nitrodiphenyl sulfone; 3,4-dimethylphenyl-2-(5-nitro-)pyridyl sulfone; and 3,4-dimethyl - 3' - nitrobenzophenone. The reactions by which the desired monomers are obtained may be any of the heretofore known reactions of organic chemistry namely oxidation, reduction, coupling, neutralization, esterification, dehydration et cetera.

Upon heating the monomer produced from the foregoing or other starting compounds, an intermediate polymeric precursor which is a water insoluble polyamic acid or polyamic acid derivative is first formed. This intermediate, which is not necessarily isolated, has the general structural formula

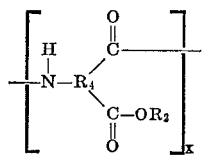

where R$_2$ and R$_4$ are as previously defined and $x$ indicates the degree of polymerization.

The intermediate may be obtained by allowing the monomer ot undergo condensation in an appropriate solvent or simply by heating the monomer until polymerization takes place. The polymeric intermediate may be recovered from solution via precipitation in water followed by filtration. This permits the intermediate to be used as a precursor in the formation of shaped structures, surface coating, the impregnation of fabric, pressure molding, and in other applications in which it is advantageous to have a polymeric precursor. Such other applications include, for example, those where the evolution of volatile condensation products must be kept at a minimum.

Heating of the intermediate polyamide regardless of whether or not it is isolated causes cyclization and formation of the polyimide. The latter has the general structural formula

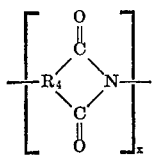

where $R_4$ and $x$ are as previously defined.

Polymerization of the monomers can be effected by promoting their condensation such as in an appropriate solvent as mentioned above, as well as through the forced removal of the other condensation products by the application of heat. The latter course will normally be employed for economic and practical reasons. The exact curing cycle will depend upon the particular monomer involved and upon the application. For example, when the polymer is used as a coating, the curing process will proceed slowly in order to prevent bubbling as the condensation products evolve. Other curing cycles for products of the present invention will similarly be dictated by the application.

The polyimides produced by condensing the monomers described above have many applications and can be employed in a wide variety of physical shapes and forms, several of which were mentioned above. Other significant applications are as films and adhesives and as components of structural composites. The polymers of the present invention may also be employed to particular advantage as high temperature insulators, flame-retardants and liners in reinforced structures, and for other protective and decorative purposes.

In short, the polymers of this invention may be used wherever polyimides have heretofore been used. In addition, they may also be employed where other polyheterocyclics are at present used but because of difficulties in processing have had limited success.

Because of the unusual solubility characteristics of the monomeric precursors, they may be processed into shaped articles by conventional techniques and then converted to the polyimide in situ. For other applications, such as fiber formation, it may be advantageous to use the polymeric intermediate as discussed above.

Polyimides as such are known substances and have heretofore been disclosed in U.S. Pats. Nos. 3,179,614 and 3,179,634 and British Pat. No. 570,858 among other publications. The polyimides disclosed in the foregoing patents and other previously known polyimides are prepared by the thermal cyclization of polyamide acid type precursors which in turn are prepared from equimolar amounts of certain tetracarboxylic acid dianhydrides and certain primary diamines. As will be apparent from the brief description of the invention set forth above, this approach to producing polyimides differs considerably from that of the present invention.

Moreover, the process of preparing polyimides in accord with the present invention represents a significant advance in the art over the process discussed in the preceding paragraph in that the precursors of the polyimides of this invention are monomers whereas the polyamide acids used in the heretofore known processes of making polyimides lack the solubility, ease of processing and other desirable properties of the monomers of the present invention.

Heretofore known processes of producing polyimide precursors require that precisely equal molar ratios of the diamine and acid components be employed as the formation of long chains cannot otherwise be obtained. This is because deviation from this equimolar ratio limits the length of the chain as the ends of the oligomers (short chains) then terminate with the same functional group, and no further chain lengthening is possible. A one percent error in this ratio limits the degree of polymerization (i.e., the number of repeating units in the chain) to 99; a 0.1 percent error limits it to 999, et cetera. Since the typical degree of polymerization desired is in the tens of thousands, even a 0.01 or 0.001 percent or smaller error in this equimolar ratio can preclude polymerization to the degree normally sought.

The novel monomers of the present invention, in contrast, incorporate an exact ratio of imide-forming functional groups in the very structure of the molecules, thus making it possible to attain the highest degree of polymerization. Accordingly, with the advent of the present invention, the polymerization of polyimides is no longer subject to the difficulties in obtaining useful chain lengths arising from weighing errors, miscalculations, and other stoichiometric fluctuations in the heretofore known processes for making polyimides.

The incorporation of the exact stoichiometry of the functional groups in one molecule according to the present invention also has other important advantages. Specifically, since the monomers of the present invention are a one-component system, problems of mixing and storage are significantly reduced or eliminated.

In addition to the foregoing the polyimide-forming materials of the present invention can be stored and marketed as solids in contrast to most heretofore known polyimide-forming materials which are sold in solution. The present invention therefore eliminates transportation costs for solvents as well as the complication involved in shipping flammable and toxic liquids.

Also, since they are solids, the precursors of the present invention, unlike those heretofore known, can be used without further processing directly in processes such as melt coating, molding, and the like.

Furthermore, the polyamide acid precursors of heretofore known ployimides have a limited shelf life, apparently because they are generally prepared in solvents which seemingly promote the reactions that lead to a useless material. In contrast, the monomers of the present invention do not require the use of such solvents. In fact, the bifunctional character of these monomers allows their use even in the absence of a reaction medium (solvent) which is normally necessary in the heretofore known two-compound system to assure stoichiometric mixing of the reactants.

An additional advantage of our novel monomers is that they are not adversely affected by water. While addition of water to solutions of these monomers will result in precipitation similar to that observed in the two-component systems, this is not detrimental since any material rendered insoluble and precipitated by the presence of water carries with it one amino group for each two carboxylic acid groups, and the material left in solution retains precisely the same stoichiometry. Accordingly, the presence of water does not adversely affect the ratio of imide forming functional groups or, consequently, the high polymer forming capability of the novel monomers disclosed herein. In contrast, in two component systems, addition of water precipitates one component preferentially because of solubility differences, and the stoichiometry of the precipitated material, as well as that of the material remaining in solution is upset, making the formation of long chains impossible for the reasons discussed above.

The process of preparing polyimides in accord with the present invention also represents a significant advance in the art over the heretofore known processes in that the imide precursor is a monomer rather than a polymer as in the latter. Since they are monomers, the precursors of this invention are soluble in low-boiling unsophisticated, low-cost organic solvents and have much lower melting points than the polyimide-forming precursors heretofore known. These advantages are, of course, of considerable practical and economic importance.

As mentioned briefly above, the polyimides of the present invention differ structurally from those of heretofore known polyimides as well as in the properties just described. This is readily apparent from comparing the general structural formula for the polyimides of the present invention set forth above with the following structural formulae of typical heretofore disclosed polyimides:

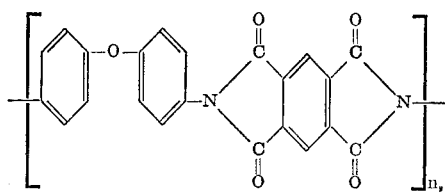

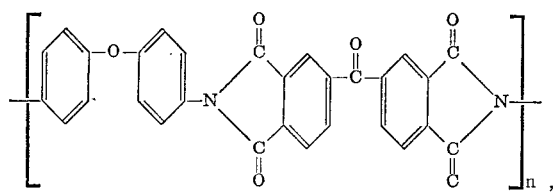

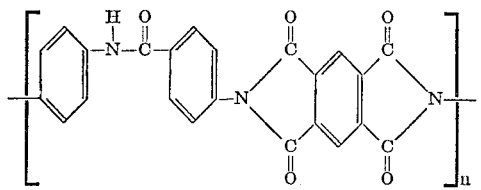

and

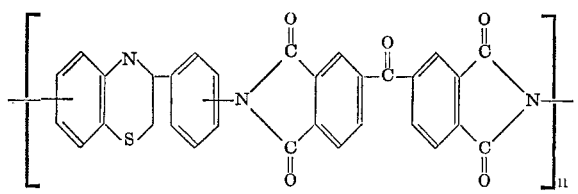

Other of the heretofore known polyimides similarly differ in structure from these of the present invention.

From the foregoing it will be apparent that one important and primary object of the present invention resides in the provision of novel, improved polymeric materials of the polyimide type and of novel, improved processes for preparing such materials.

Other important and related but more specific objects of the present invention include the provision of polymers:

(1) which can be tailored to the requirements of a particular application.

(2) which can be prepared in substantially simpler fashion than those heretofore known.

(3) in which the degree of polymerization is not affected by stoichiometrical fluctuations such as those caused by weighing errors and miscalculations.

(4) which may be used in applications where polyhetrocyclics have heretofore been employed as well as the applications for which the previously known polyimides have heretofore been used.

Another important and primary object of the present invention resides in the provision of novel, improved monomeric imide forming materials and in the provision of novel, improved methods for preparing the monomers and for converting them to high molecular weight polymers of the imide type.

Related and important but more specific objects of the invention include the provision of novel imide forming monomeric materials:

(1) which are easily handled, resinous solids, usable directly in processes such as melt coating, pressure molding, and the like.

(2) in which each molecule has a stoichiometric ratio of imide forming functional groups and in which polymerization is not precluded by weight errors or miscalculations.

(3) which constitute a one-component system and which accordingly significantly reduce the mixing and storing problems heretofore associated with polyimides and the preparation of their precursors.

(4) which are not adversely affected by contact with water.

(5) which have an indefinite shelf life.

(6) which are more soluble in inexpensive, low boiling solvents and have lower melting points than the heretofore available polyimide precursors.

(7) which can be made into shaped structures by conventional techniques and then converted to polyimides in situ.

A further important and primary object of the present invention resides in the provision of novel polyamic acid type precursors for high molecular weight polyimides and to novel improved methods of preparing precursors of such compounds.

Additional important and related but more specific objects of the present invention are the provision of polyamic acid type precursors for the preparation of polyimides which:

(1) are readily isolable and can accordingly be marketed as such and can be employed directly in various applications where a polymeric precursors is preferable to one that is a monomer.

(2) are not sensitive to water and accordingly can be employed to particular advantage in application where such property is an asset.

(3) are easily prepared from corresponding monomeric precursors.

Other important objects, additional novel features, and further advantages of the present invention will become apparent to those skilled in the relevant arts from the appended claims and the foregoing general description of the invention in conjunction with the following examples, which illustrate the preparation of exemplary novel monomers and polymers embraced within its scope.

EXAMPLE I

Preparation of diethyl-4-aminodiphenyl sulfone-3',4'-dicarboxylate

The preparation of this compound is exemplary of the syntheses which can be employed to produce the novel monomeric precursors of the present invention. The first step is the preparation of 3',4-dimethyl-4-nitrodiphenyl sulfone, which may be regarded as a starting material for the monomeric precursor. This compound is then oxidized and the oxidation is followed by reduction of the nitro group. Each of these steps is described in detail below.

(A) Preparation of 3,4-dimethyl-4'-nitrodiphenyl sulfone

Pure o-xylene (530 g., 5M) was cooled to 15° C. with stirring. Chlorosulfonic acid was added dropwise at a sufficiently slow rate to keep the temperature of the mixture around 15° C. until 1,165 g. (10M) had been added. The mixture was stirred for an additional hour and then poured over 5 kg. of cracked ice. The solids were isolated by filtration and air dried. The yield was 85% of a material which melted at 47–50° C., confirming the literature value for the expected 3,4-dimethylbenzene sulfonyl chloride. (J. Am. Chem. Soc. 62, 511 (1940)).

Crude 3,4-dimethylbenzene sulfonyl chloride, thus isolated, and $Na_2SO_3 \cdot 7H_2O$ (2,470 g., 10M) were slurried in 4 liters of water with slow addition of 50% sodium hydroxide solution to maintain the mixture slightly alkaline. Stirring was continued for two additional hours. The mixture was then heated, and the insoluble material (diarylsulfone, a side product from the previous reaction) was filtered off. The filtrate was allowed to cool, effecting crystallization of the sodium sulfinate. This was collected by filtration and air dried.

A second crop of the sodium salt was obtained by heating the filtrate and adding sufficient sodium chloride to saturate the solution followed by cooling to room temperature.

A small amount of the free sulfinic acid was isolated for identification purposes. The 3,4-dimethylbenzenesulfinic acid melted at 177–180° C. and had the characteristic infrared absorptions.

The entire amount of sodium sulfinate (hydrate) was suspended in approximately 3 liters of dimethylformamide (DMF) and allowed to react with a stoichiometric amount of p-chloronitrobenzene as the temperature was raised to 120–130° C. After two hours of stirring, the mixture was cooled and poured over 4 kg. of cracked ice. The crude product was isolated by suction filtration, air dried, and recrystallized from ethanol until the product melted at 129.5–130.5° C.

A small sample of the purified sulfone was analyzed:
Analysis.—Calc'd for $C_{14}H_{13}NO_4S$ (percent): C, 57.71; H, 4.51; N, 4.81. Found (percent): C, 57.51; H, 4.48; N, 4.73; S, 10.85.

(B) Oxidation of 3,4-dimethyl-4'-nitrodiphenyl sulfone

The 4-nitro-3',4-dimethyldiphenyl sulfone produced as described in Section A (58 g., 0.2M) and sodium dichromate (160 g., 0.55M) were slurried in 1000 mls. of 65% by weight sulfuric acid. The mixture was cooled to −5° C. and stirred as 98% sulfuric acid was added while keeping the temperature between −5 and +5° C. After 1000 mls. of concentrated sulfuric acid had been added, the mixture was stirred for an additional two hours. It was then allowed to come to room temperature, and stirring was continued for 15 more hours. The resulting bluish-green, viscous mixture was poured over 5 kg. of cracked ice and 2 kg. of water, and the crude dicarboxylic acid was isolated by filtration.

The crude product was extracted with 10% potassium bicarbonate and the unreacted sulfone filtered off. The filtrate was acidified with 1N hydrochloric acid to a pH of 1. The precipitated acid was collected by suction filtration and washed with distilled water until free from chloride ion. The material was recrystallized from acetic acid as small, off-white needles weighing 40 grams and melting at 192–195° C.

A portion of the acid was dehydrated by treating with boiling acetic anhydride. The resulting material melted at 227–229° C. and showed the infrared absorptions characteristic of carboxylic acid anhydride at 1800 $cm.^{-1}$.

A second portion of the acid was then dissolved in ethanol, treated with charcoal, and esterified in the presence of sulfuric acid as the water was azeotroped off with benzene. The resulting diester was amorphous and melted at about 60° C. Infrared spectra confirmed the structure as that of the expected diester.

(C) Reduction of the nitro group

The diester was dissolved in ethanol, and reduction of the nitro group was effected with stannous chloride and hydrochloric acid. When reduction had taken place, the mixture was neutralized to a pH of 6 with sodium carbonate solution. As the tin salts came out of solution, additional amounts of ethanol were added to keep the organic material in solution. The inorganics were filtered off, and the monomer (diethyl-4-aminodiphenyl sulfone-3',4'-dicarboxylate) was isolated from ethanol-water.

The vacuum-dried monomer proved to be an amorphous material that polymerized upon heating. It melted in the range of 65–75° C., and condensation began to take place at approximately 120° C.

EXAMPLE II

Polymerization of diethyl-4-aminodiphenyl sulfone-3',4'-dicarboxylate

A film of the monomer prepared according to Example I was subjected to the following curing cycle in air: ½ hour at 200° F., ½ hour at 300° F., and ½ hour at 600° F. Infrared absorptions of this material before drying and after each of the heating stages are shown in the following table:

| | Film curing conditions | | | | |
|---|---|---|---|---|---|
| | —NH— | —CO— (general) | —CO— (amide) | Imide (ring) | —OR (ester) |
| Absorption range ($cm.^{-1}$) | 1,620 | 1,800–1,650 | 1,525–20 | 1,370–1,340 | 1,300 |
| (1) Room temperature | Singlet; medium intensity | Doublet; 1,720 and 1,690 | None | None | Broad; strong. |
| (2) ½ hour 200° F | Singlet; decreased intensity from (1). | Singlet; shift to 1,720+ | Singlet; weak | Very weak | Narrowed; decreased. |
| (3) ½ hour 300° F | Singlet; decreased intensity from (2). | Doublet; strong-1,725; weak-1,780. | Singlet; medium | Medium | Decreased. |
| (4) ½ hour 600° F | None | Doublet; strong-1,730; medium-1,780 (imide). | None | Strong | None. |

As shown by the foregoing table, condensation took place with the formation of the intermediate polyamide followed by cyclization yielding the polyimide at the end of the curing cycle; and no degradation occurred. The film thus produced was strong, tough, and light yellow in appearance.

EXAMPLE III

Alternate reduction of nitro group

The reduction of the nitro group on the intermediate may be accomplished by any alternate technique desired. To show this, 26 g. of the nitro-acid anhydride produced as described in Section B of Example I was dissolved in 200 mls. of ethanol and placed in a hydrogenation bomb with 0.25 g. of Adams Catalyst. Reduction proceeded at 60 p.s.i.g. with agitation.

The reaction mixture was removed from the bomb, the solids were filtered off, and the filtrate was treated with charcoal. The resulting solution was light orange in color.

The ethanol was removed under reduced pressure at 50° C., leaving the amino half ester, which was a canary yellow amorphous material with a melting range of 75–85° C. and a condensation range of 115–120° C. Its infrared spectrum showed the absorptions characteristic of primary amines.

EXAMPLE IV

Polymerization of 4-aminodiphenyl sulfone-3',4'-dicarboxylic acid, monoethyl ester To illustrate typical applications of the novel monomeric materials of the present invention, a small amount of 4-aminodiphenyl sulfone-3',4'-dicarboxylic acid, monoethyl ester was dissolved in ethanol and deposited as a film. The film was dried, staged to 600° F. slowly, and allowed to age at this temperature for 24 hours. The result was an amber, flexible film which showed infrared absorptions during the ensuing polymerization identical to those tabulated in Example II.

Another portion of the ethanol solution was allowed to foam in bulk under the same staging conditions. This formed a flexible exfoliated mass.

A similar solution of approximately 20% solids was prepared and impregnated onto 181-112 glass fabric; and a 3" x 3" 5-ply laminate was prepared using the same curing schedule under 200 p.s.i.g. The composite had a dense appearance and the ringing sound characteristic of high modulus associated with structures of this type.

EXAMPLE V

Polymerization of related monomers

Catalytic reductions of the nitro groups were performed on the methyl-, n-propyl-, isopropyl-, and benzyl half esters of 4-aminodiphenyl sulfone-3',4'-dicarboxylic acid in the corresponding alcohols by the techniques described above to produce the corresponding homologs of diethyl-4-aminodiphenyl sulfone-3',4'-dicarboxylate. The resulting monomers polymerized progressively slower as the homolog became higher. With the exception of the methyl system, which discolored somewhat, these systems yielded polymers similar to those obtained from the ethyl analog.

The following examples illustrate the preparation of other of the monomers contemplated by the present invention.

EXAMPLE VI

Preparation of 4-aminodiphenylether-3',4'-dicarboxylic acid 3,4-xylenol and a molar equivalent of NaOH were dissolved in DMF. An equivalent amount of p-chloronitrobenzene was added, and the mixture was heated to 120-130° C. The 3,4-dimethyl-4'-nitrodiphenylether was isolated and purified.

The ether was oxidized to 4-nitrodiphenylether-3',4'-dicarboxylic acid as previously described. Reduction of the nitro group present in the 4-nitrodiphenylether-3',4'-dicarboxylic acid was then effected with stannous chloride in hydrochloric acid solution and, alternatively, with hydrogen in the presence of Adam's catalyst in ethanol.

Infrared analysis confirmed that the resulting product was in each case 4-aminodiphenylether-3',4'-dicarboxylic acid, an imide forming monomeric material in accord with the present invention.

EXAMPLE VII

Preparation of 3-nitrobenzophenone-3',4'-dicarboxylic acid m-Nitrobenzoyl chloride (185 g. 1.0M) was dissolved in 600 mls. of dry o-xylene and cooled to —5° C. Aluminum chloride (160 g. 1.2M) was added in portions as the temperature was kept between —5 and 0° C. When all the aluminum chloride had been added the reaction mixture was allowed to reach room temperature and then stirred for an additional fifteen hours. It was then heated to 100° C. and held there for two hours. The reaction mixture was poured over cracked ice, and crude 3,4-dimethyl-3'-nitrobenzophenone was isolated by suction filtration. The ketone was recrystallized from acetic acid. It melted at 101.5–103.5° C.

Oxidation to the corresponding o-dicarboxylic acid was accomplished as described in Example I. The acid was recrystallized from acetic acid and found to have a melting range of 175–180° C.

The monomer, 3-aminobenzophenone-3',4'-dicarboxylic acid, was obtained by catalytic reduction of the nitro analog as described in Example I. Infrared analysis confirmed that the resulting amorphous, alcohol-soluble product was the desired compound.

EXAMPLE VIII

Preparation of monoethyl-4-nitrobenzophenone-3',4'-dicarboxylate p-Nitrobenzoyl chloride, o-xylene, and aluminum chloride were allowed to react as described in Example VII. The purified 3,4 - dimethyl - 4' - nitrobenzophenone was oxidized as described in Example I. The acid was purified by recrystallization in acetic acid. It had a melting point of 203–205° C.

The diacid was dehydrated, purified and recrystallized from a hot acetic acid/acetic anhydride mixture. The crystalline anhydride melted at 200–205° C. Esterification proceeded slowly as the anhydride dissolved in dry ethanol. Reduction of the mono-ester as previously described yielded the desired monomer.

EXAMPLE IX

Conversion of polymeric materials

The monomers described in Examples VI through VIII can be converted to the corresponding polyamide acids by heating them to approximately 125° C. in the absence of a solvent or in the presence of a polar solvent that promotes amide formation (refluxing N,N-dimethylformamide, N-methylpyrrolidone, and N,N-dimethylacetamide have been used successfully).

These polyamide acid intermediates (whether isolated or not), yield the corresponding polyimides, polydiphenylether-3,4 - dicarboxy - 4' - imide; polybenzophenone-3,4-dicarboxy-3'-imide; and polybenzophenone-3,4-dicarboxy-4'-imide, when subjected to a curing cycle similar to that described in Example II.

EXAMPLE X

Preparation of polybenzophenone-3,4-dicarboxy-4'-imide

To further illustrate the types of monomer which are capable of being condensed to polyimides in accord with the principles of the present invention, 4-aminobenzophenone-3',4'-dicarboxylic acid, monoethyl ester was heated slowly beyond its melting point (100 to 300° C. for fifteen hours). A reaction occurred yielding a polymer as evidenced by the evolution of the condensation product (water). The polymeric material was removed from the oven and allowed to cool to room temperature. It was then powdered and analyzed infrared spectroscopy. The analysis revealed an absence of amine and amide absorptions and the presence of strong imide bands of 1790 and 1370 cm.$^{-1}$, showing that the polyimide had formed.

The invention may of course be embodied in specific forms other than those discussed in the preceding example and elsewhere above without departing from the spirit or essential characteristics thereof. The specific embodiments thus described are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A method of preparing a polyimide in which a monomer of the formula

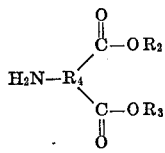

wherein $R_2$ and $R_3$ are each selected from the group consisting of hydrogen, methyl, ethyl, propyl, and isopropyl, wherein $R_4$ is a trivalent binuclear radical containing two aromatic rings joined by a carbon-to-carbon bond or a bridging radical of the formula

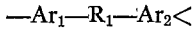

and wherein the two carbonyl groups are attached to adjacent carbon atoms in one of said aromatic rings and the amino group is situated on a portion of the radical $R_4$ other than the ring to which the carbonyl groups are attached, or a mixture of such compounds, is heated in the absence of a solvent to a temperature beyond its melting point and in the range of 100–300° C. to polymerize the compound or compounds.

2. The method of claim 1, wherein $R_4$ has the formula $$-Ar_1-R_1-Ar_2<$$

and wherein $R_1$ is as aforesaid, $Ar_1$ is a phenylene or a pyridine, and $Ar_2$ is a trivalent phenyl radical.

3. The method of claim 2, wherein $R_4$ is selected from the group consisting of

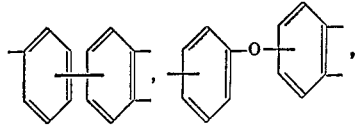

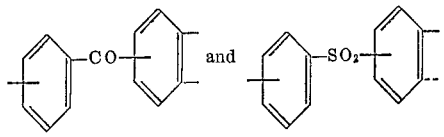

4. A method of preparing a polyimide in which aminodiphenylsulfone-3′,4′-dicarboxylic acid; a methyl, ethyl, propyl, or isopropyl mono- or di-ester of said acid; or a mixture of two or more of the foregoing is heated in the absence of a solvent to a temperature beynd its melting point and in the range of 100–300° C. to polymerize the compound or compounds.

5. A method of preparing a polyimide in which 4-amino-diphenylether-2′,4′-dicarboxylic acid; 4-aminobenzophenone-3,4-dicarboxylic acid; or 3-aminobenzophenone-3′,4′-dicarboxylic acid; a methyl, ethyl, propyl, or isopropyl diester of one of said acids; or a mixture of two or more of the foregoing is heated to a temperature beyond its melting point and in the range of 100–300° C. in the absence of a solvent to polymerize the compound or compounds.

References Cited
UNITED STATES PATENTS

| | | | |
|---|---|---|---|
| 3,391,120 | 7/1968 | Fritz | 260—63 |
| 3,414,546 | 12/1968 | Werntz | 260—78 |
| 3,450,678 | 6/1969 | Rogers | 260—78 |
| 3,503,928 | 3/1970 | Gilch et al. | 260—47 |

OTHER REFERENCES

Bogert et al.: "4-Amino-o-Phthalic Acid and some of Its Derivatives," Journal American Chemical Society, vol. 30 (1908), pp. 1135–1144.

WILLIAM H. SHORT, Primary Examiner

L. L. LEE, Assistant Examiner

U.S. Cl. X.R.

260—65, 78 TF, 304, 309.2, 471 R, 517, 518 R, 520